(12) United States Patent
Shinno et al.

(10) Patent No.: US 8,363,290 B2
(45) Date of Patent: Jan. 29, 2013

(54) IMAGE READING APPARATUS

(75) Inventors: Tatsuya Shinno, Toyokawa (JP);
Hiroshi Nishikawa, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 629 days.

(21) Appl. No.: 12/571,118

(22) Filed: Sep. 30, 2009

(65) Prior Publication Data

US 2010/0085616 A1    Apr. 8, 2010

(30) Foreign Application Priority Data

Oct. 3, 2008    (JP) ................ 2008-258614

(51) Int. Cl.
*H04N 1/04* (2006.01)
(52) U.S. Cl. .................. 358/498; 399/299
(58) Field of Classification Search ........ None
See application file for complete search history.

(56) References Cited

U.S. PATENT DOCUMENTS

| | | | |
|---|---|---|---|
| 7,370,659 B2 * | 5/2008 | Hickman et al. ........ 134/1.3 |
| 2003/0043419 A1 * | 3/2003 | Brown et al. ........ 358/443 |
| 2003/0219288 A1 * | 11/2003 | Hagiwara et al. ........ 399/299 |
| 2003/0231910 A1 * | 12/2003 | Kabashima et al. ........ 399/349 |
| 2008/0204485 A1 | 8/2008 | Matsumoto |
| 2008/0239416 A1 * | 10/2008 | Kato et al. ........ 358/498 |
| 2009/0003858 A1 * | 1/2009 | Nishida ........ 399/48 |
| 2009/0010669 A1 * | 1/2009 | Takenouchi et al. ........ 399/74 |

FOREIGN PATENT DOCUMENTS

| | | |
|---|---|---|
| JP | 2000-270152 | 9/2000 |
| JP | 2004-236252 | 8/2004 |
| JP | 2008-5165 | 1/2008 |
| JP | 2008-207417 | 9/2008 |

OTHER PUBLICATIONS

Notification of Reasons for Refusal mailed Aug. 21, 2012, directed to Japanese Application No. 2008-258614; 5 pages.

* cited by examiner

*Primary Examiner* — Twyler Haskins
*Assistant Examiner* — Helen Q Zong
(74) *Attorney, Agent, or Firm* — Morrison & Foerster LLP

(57) ABSTRACT

An image reading apparatus that feeds a document over a reading glass and optically reads an image of the document at a reading position. A rotary brush type cleaner is located above the reading glass to face the reading position. The cleaner cleans the reading glass while rotating downstream in a document feeding direction. In accordance with a selected reading mode, the frequency of cleaning operations performed by the cleaner, and the rotation speed and the number of rotations of the cleaner are changed.

16 Claims, 12 Drawing Sheets

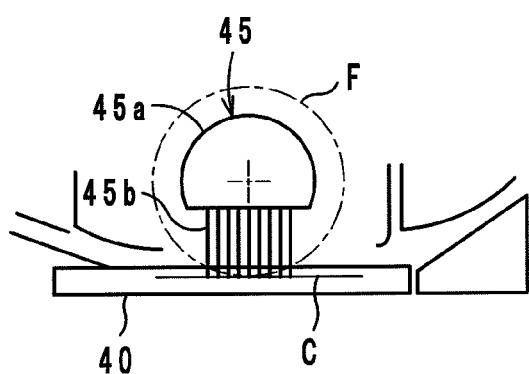
F I G. 4a
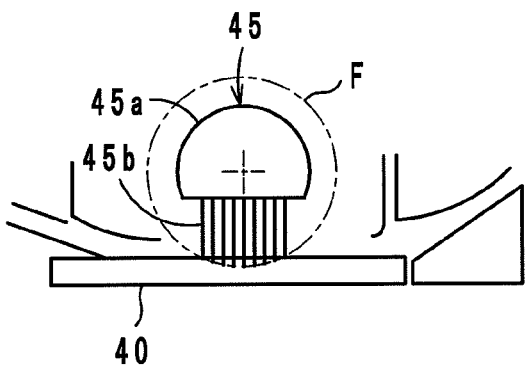
F I G. 4b
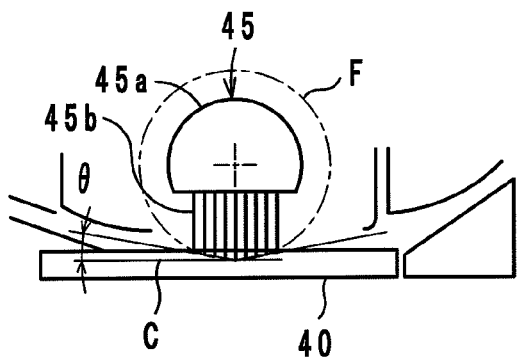
F I G. 4c
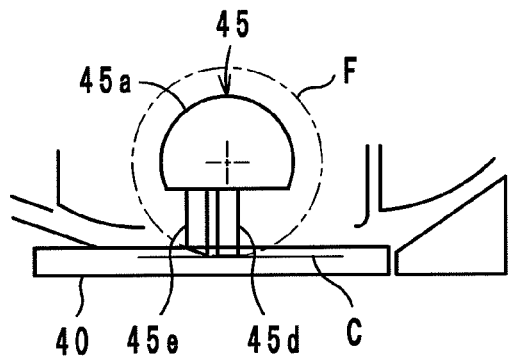
F I G. 4d

F I G. 5
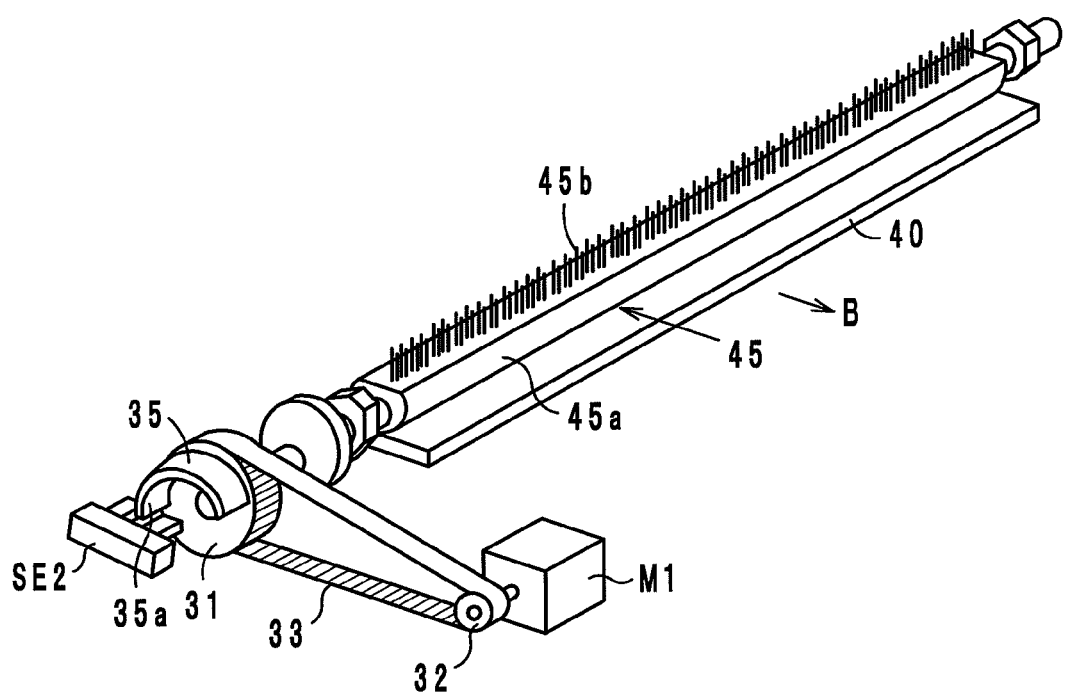

IMAGE READING APPARATUS

This application is based on Japanese patent application No. 2008-258614 filed on Oct. 3, 2008, of which content is incorporated herein by reference.

BACKGROUND OF THE INVENTION

1. Field of the Invention

The present invention relates to an image reading apparatus, and more particularly to a sheet-through type image reading apparatus that is suited to be employed in a copying machine or a scanner as an image input device.

2. Description of Related Art

In the art of image reading apparatuses for reading images optically, a platen-set method wherein an image of a document set on a platen glass is read and a sheet-through method wherein an image of a document is read while the document is being fed are adopted separately or at the same time. The sheet-through method is advantageous in its small size, low cost, low noise, high-speed image reading and high printing efficiency. Therefore, the sheet-through method is generally adopted for monochromatic copying machines and color copying machines.

In the sheet-through method, an image reading position is fixed on a transparent member (a strip of reading glass), and a reading optical system is designed to have a focus on an imaged-surface of a document fed over the reading glass. Therefore, image reading is apt to be influenced by foreign matters such as dust adhering to the reading glass, and portions shaded by the foreign matters are read as image noise, that is, stripes. When the document is paper, there is inevitably raised a problem that very small foreign matters such as loading material (e.g., calcium carbonate) and fiber contained in the paper adhere to the reading glass.

In order to avoid this trouble, conventionally, various measures as follows have been taken during the step of processing the read image; detecting noise in the read image and alarming the user; erasing stripes in the step of image processing; or moving the reading glass not to read the dust any further. However, none of these measures can solve the problem that dust is deposited on the reading glass, which consequently necessitates a serviceman to clean the reading glass.

Japanese Patent Laid-Open Publication No. 2000-270152 discloses an image reading apparatus comprising an elastic cleaner that cleans a reading glass while rotating. Since foreign matters are carried onto the reading glass by documents fed thereto, it is preferred that the cleaning is performed at intervals among arrivals of documents. The use of a rotary cleaner requires only a short time for cleaning, and therefore, this method is advantageous to the image reading efficiency.

In order to improve the image reading efficiency, the intervals among documents fed to the reading position shall be minimized. However, the minimization of the intervals among documents shortens the time for which the reading glass can be exposed to the cleaning, and satisfactory cleaning of the reading glass becomes impossible. Further, there are various image reading modes, such as a high-resolution mode, a low-resolution mode, etc., and the cleaning operation must be varied in accordance with the various image reading modes.

Thus, the image reading efficiency and the cleaning effect are incompatible with each other, and it is necessary to adjust the cleaning operation to the document feeding speed, the intervals among documents, etc. However, Japanese Patent Laid-Open Publication No. 2000-270152 does not discuss this point.

SUMMARY OF THE INVENTION

It is an object of the present invention is to provide an image reading apparatus that can achieve both satisfactory image reading efficiency and satisfactory cleaning effect of removing foreign matters from a reading glass.

In order to attain the object, in a first aspect of the present invention, an image reading apparatus comprises: a document feeder for feeding documents one by one such that each document can pass through an image reading position; an image reader for optically reading an image of a document passing through the image reading position; a transparent member located between the document passing through the image reading position and the image reader; a cleaner for performing a cleaning operation by sweeping a surface of the transparent member on which the document passes, the cleaner having elasticity; and a controller for controlling drives of the cleaner and other elements, and the controller enables the image reading apparatus to operate in various reading modes, enables the cleaner to operate in various cleaning modes and changes a frequency of cleaning operations performed by the cleaner in accordance with a selected image reading mode.

In a second aspect of the present invention, an image reading apparatus comprises: a document feeder for feeding documents one by one such that each document can pass through an image reading position; an image reader for optically reading an image of a document passing through the image reading position; a transparent member located between the document passing through the image reading position and the image reader; a cleaner for performing a cleaning operation by sweeping a surface of the transparent member on which the document passes, the cleaner having elasticity; and a controller for controlling drives of the cleaner and other elements, and the controller enables the image reading apparatus to operate in various reading modes, enables the cleaner to operate in various cleaning modes and changes a rotation speed of the cleaner and/or a number of rotations of the cleaner in accordance with a selected image reading mode.

In a third aspect of the present invention, an image reading apparatus comprises: a document feeder for feeding documents one by one such that each document can pass through an image reading position; an image reader for optically reading an image of a document passing through the image reading position; a transparent member located between the document passing through the image reading position and the image reader; a cleaner for performing a cleaning operation by sweeping a surface of the transparent member on which the document passes, the cleaner having elasticity; and a controller for controlling drives of the cleaner and other elements, and the controller enables the image reading apparatus to operate in various reading modes, enables the cleaner to operate in various cleaning modes and sets feeding intervals among documents such that a feeding interval in which the cleaner does not perform the cleaning operation is shorter than a feeding interval in which the cleaner performs the cleaning operation.

Generally, noise caused by foreign matters in the reading position is more remarkable in high-resolution image reading than in low-resolution image reading. Therefore, by controlling the frequency of cleaning operations such that cleaning operations are performed more frequently in the high-resolution image reading than in the low-resolution image reading, the cleaning effect in the high-resolution image reading can be improved without lowering the reading efficiency in the low-resolution image reading. Also, by controlling the rotation speed of the cleaner such that the rotation speed is higher in the low-resolution image reading than in the high-resolution image reading, the reading efficiency in the low-resolution image reading is never lowered. By controlling the number of rotations of the cleaner such that the number of rotations is larger in the high-resolution image reading than in the low-resolution image reading, the cleaning effect in the high-resolution image reading can be improved without lowering the reading efficiency in the low-resolution image reading. Further, by controlling feeding intervals among documents such that a feeding interval in which the cleaning operation is not performed is shorter than a feeding interval in which the cleaning operation is performed, the reading efficiency when the cleaning operation is not performed is never lowered.

BRIEF DESCRIPTION OF THE DRAWINGS

This and other objects and features of the present invention will be apparent from the following description with reference to the accompanying drawings, in which:

FIGS. 4a-4d are illustrations showing various shapes of a brush for the cleaner;

FIG. 5 is a mechanism for driving the cleaner;

DETAILED DESCRIPTION OF THE PREFERRED EMBODIMENTS

Figure 1:
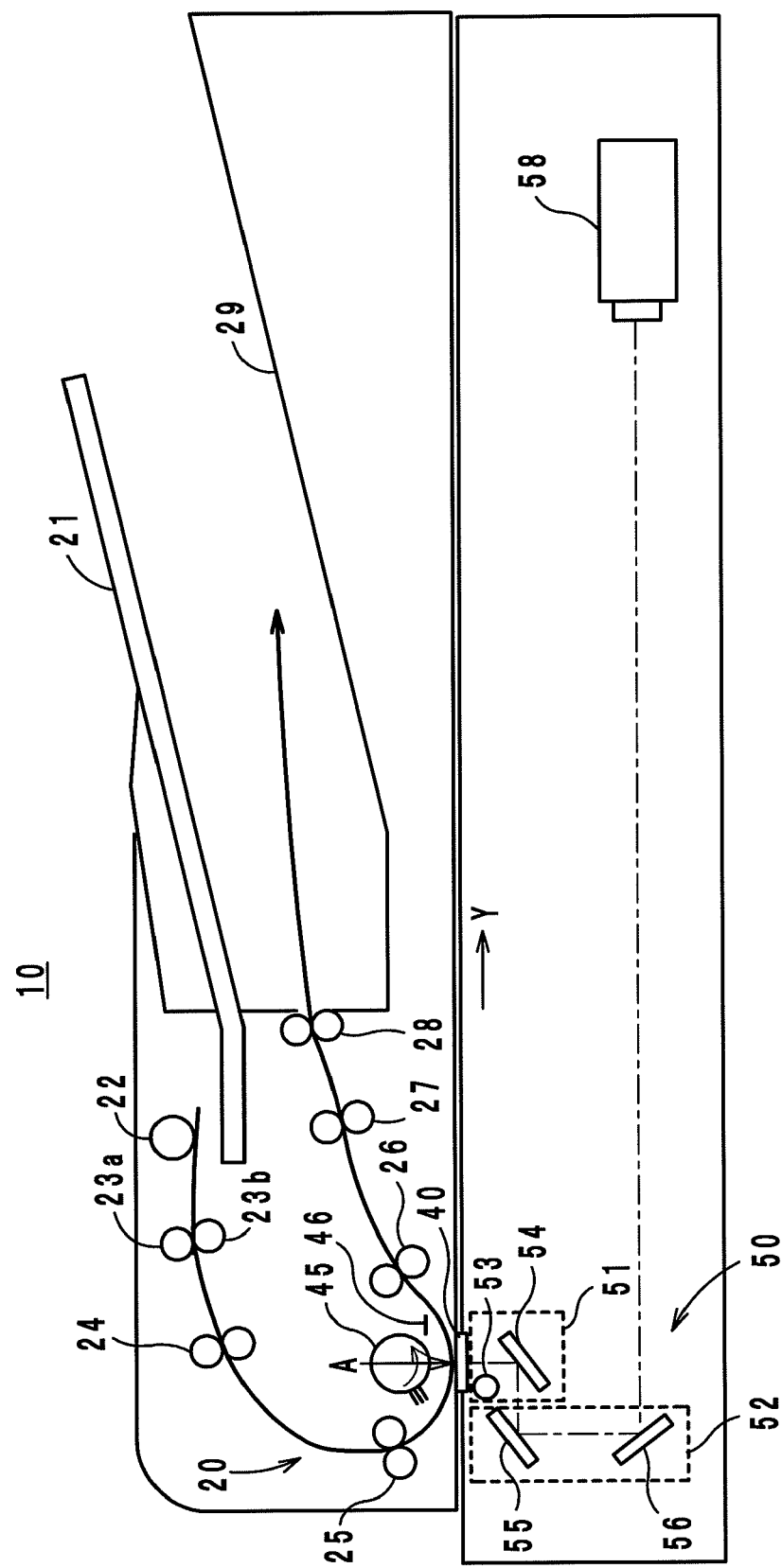
FIG. 1 is a schematic view showing the general structure of an image reading apparatus according to an embodiment of the present invention.

An image reading apparatus according to a preferred embodiment of the present invention is hereinafter described with reference to the accompanying drawings. In the drawings, the same parts and the same members are provided with the same reference symbols, and repetitious descriptions are avoided.

Image Reading Apparatus; See FIGS. 1 and 2

FIG. 1 shows an image reading apparatus 10 according to an embodiment of the present invention. The image reading apparatus 10 is operable in a platen-set mode and in a sheet-through mode. In the platen-set mode, an image of a document set on a platen glass (not shown) is read, and in the sheet-through mode, an image of a document fed by an automatic document feeder is read. The image reading apparatus 10 has a scanning system 50.

The scanning system 50, which is of a well-known type, comprises a lamp 53, mirrors 54, 55 and 56, an imaging lens (not shown) and an image pick-up section (CCD color line sensor) 58. In order to enable image reading in the platen-set mode, the lamp 53 and the mirror 54 are fixed to a first slider 51, and the mirrors 55 and 56 are fixed to a second slider 52, the first slider 51 and the second slider 52 being movable separately in a sub-scanning direction "Y". Image reading in the sheet-through mode is performed while the scanning system 50 is kept in a reading position "A" as shown in FIG. 1.

The automatic document feeder 20 comprises a document feed tray 21, a pick-up roller 22, a feed roller 23a, a separation roller 23b, resist rollers 24, reading rollers 25 and 26, ejection rollers 27 and 28, and a document receiving tray 29. In the reading position "A", a transparent member (reading glass 40) is provided.

Figure 2:
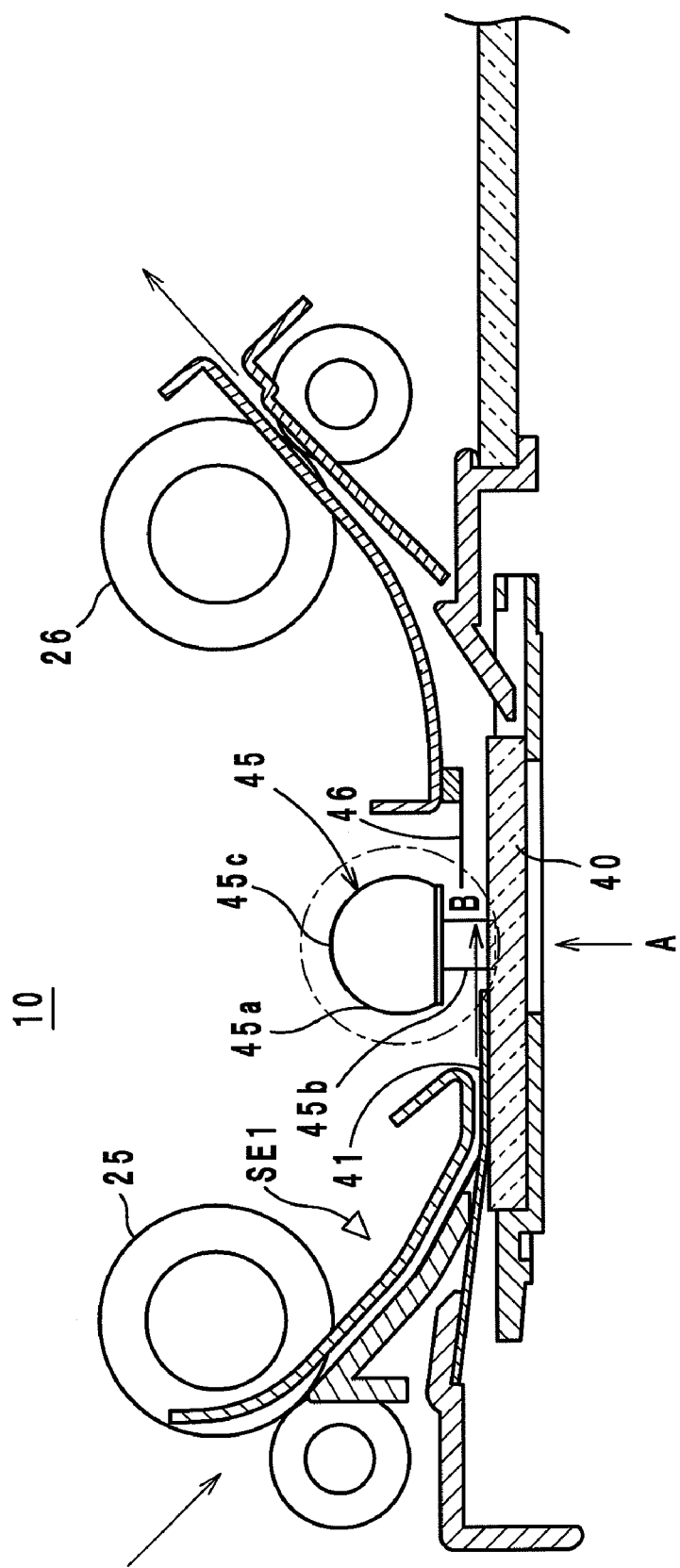
FIG. 2 is a sectional view showing an image reading position and the neighbors.

As shown in FIG. 2, in this embodiment, further, in order to keep image sides of documents out of contact with the reading glass 40, a guide plate 41 for guiding a document is provided in an upstream position from the reading glass 40 with respect to a document feeding direction "B". A document fed toward the reading glass 40 slides on the guide plate 41 and is guided to pass over the reading glass 40 with its image side out of contact with the surface of the reading glass 40.

If a document is fed through the reading glass 40 while kept in contact with the reading glass 40, sticky foreign matters on the document (for example, a sticky tape, glue, drips of ink, liquid paper, eraser dust, etc.) may be transferred and stuck to the reading glass 40. By feeding a document with its image side out of contact with the reading glass 40, it is possible to prevent such foreign matters from being transferred and stuck onto the reading glass 40. In this embodiment, even if foreign maters are stuck onto the reading glass 40, a cleaner 45 will clean up the foreign matters as will be described later.

The non-contact feeding of documents can be achieved by feeding a document while curving the document at an appropriate curvature by use of the reading rollers 25 and 26, besides by providing the guide plate 41.

In this embodiment, further, it is possible to read images on both sides of a document continuously by making the document pass through the reading glass 40 twice with reversing the document. The mechanism for enabling continuous image reading of both sides of a document is well known, and a description thereof is omitted.

Cleaner; See FIGS. 2-5

As shown in FIG. 2, a rotary brush cleaner 45 is provided to face the reading position "A" of the reading glass 40. Further, in a downstream position from the cleaner 45 in the document feeding direction "B", a duster 46 is provided. The cleaner 45 has, on a shaft 45a, a brush 45b standing in a direction perpendicular to the document feeding direction "B". The cleaner 45 is driven by a motor M1 (see FIG. 5) to rotate forward and backward at predetermined times and at predetermined speeds. Additionally, a white reference member (white film) 45c for shading correction may be stuck on the circumference of the shaft 45a, at a portion opposite from the brush 45b.

The cleaning brush 45b is, for example, composed of hairs (6 mm in length and about 2 deniers in thickness) of conductive (11.5 Log $\Omega$) polyimide resin, and the hairs are planted in an area 5 mm (width) by 309 mm (length). When the brush 45 rubs the reading glass 40, the tip portions of 1.5 mm of the hairs are pressed up against the reading glass 40 by a pressure of 6N.

The duster 46 is fixed in the position. After the brush 45b sweeps the reading glass 40 to catch foreign matters, the duster 46 dusts the foreign matters from the brush 45b.

Figure 3A:
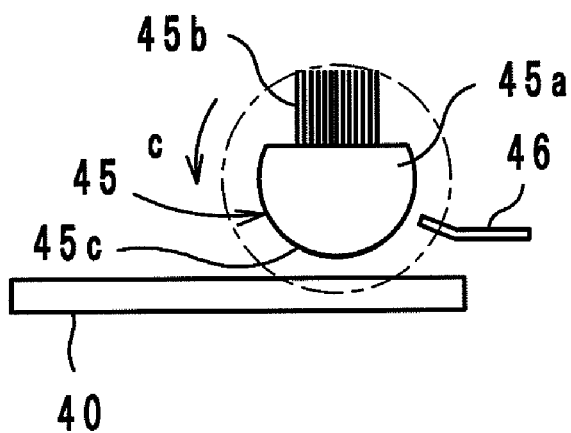
FIGS. 3a-3c are illustrations showing a cleaning operation by a cleaner.
Figure 3B:
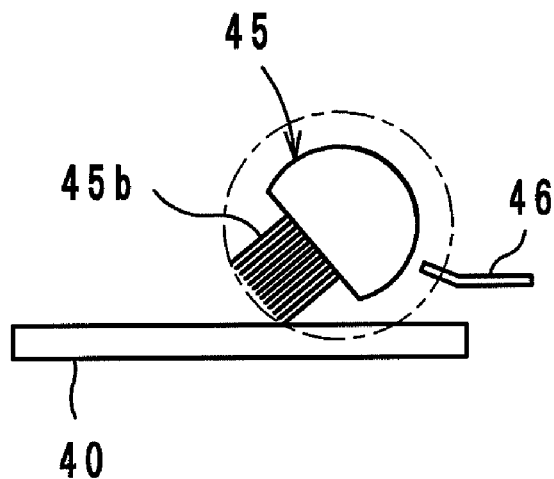
Figure 3C:
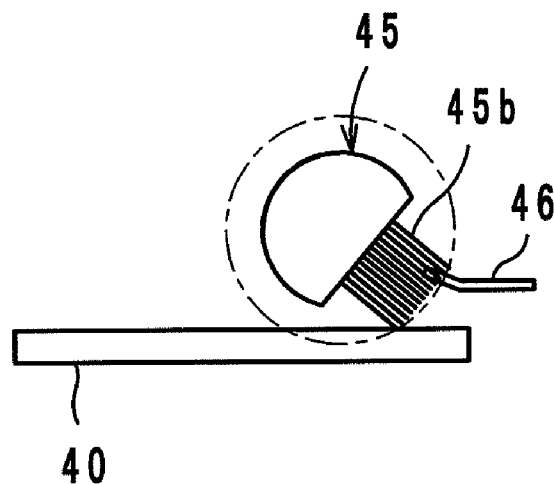

The cleaner 45 stands by in a home position as shown by FIG. 3a with the brush 45b face up. From the home position, the cleaner 45 rotates forward in a direction indicated by arrow "c" in accordance with the document feeding direction. Then, the tip portion of the brush 45b sweeps the reading glass 40 (see FIGS. 3b and 3c) and thereby, the brush 45b catches foreign matters on the reading glass 40 and removes the foreign matters from the reading position "A". Thereafter, the brush 45b comes into contact with the duster 46 and returns to the home position.

The foreign matters are dusted from the brush 45b by the duster 46 and are ejected from the image reading apparatus 10 together with the document fed over the reading glass. With this arrangement, the surface of the reading glass 40 (especially the reading position "A") and the brush 45b can be always kept clean. Therefore, it never happens that the foreign matters caught by the brush 45b adhere to the reading glass 40 again, and stripe noise on reproduced images can be prevented. Further, a sucker may be provided to suck up the foreign matters dusted from the brush 45b.

The brush 45b is conductive and is grounded. Since the brush 45b attracts foreign matters by electrostatic, the brush 45b can catch foreign matters effectively.

Now, referring to FIGS. 4a-4d, the shape of the tip portion of the cleaning brush 45b is described. FIG. 4a shows a first example, wherein all the hairs of the brush 45b are of the same length so that the tips of the hairs are on a tangent "C" of the rotation locus "F" of the brush 45b. FIG. 4b shows a second example, wherein the tips of the hairs are on the rotation locus "F". FIG. 4c shows a third example, wherein the tips of the hairs are on a line at an angle θ to the tangent "C". FIG. 4d shows a fourth example, wherein the brush 45b are composed of two bundles of hairs 45d and 45e, the tips of the hairs of the bundle 45d being on the tangent "C" and the tips of the hairs of the bundle 45e being slanted along the rotation locus "F".

In the examples shown by FIGS. 4b, 4c and 4d, when the brush 45b rotates and rubs the reading glass 40, there are no hairs of which tip portions cross over the rotation locus "F". Therefore, the degree and the pressure of the contact between the brush 45b and the reading glass 40 are always constant.

The cleaning operation of the reading glass 40 by the cleaner 45, that is, the forward rotation of the cleaner 45 at the reading position "A" is performed at such a time not to interfere with the document fed through the reading position "A". In this embodiment, as will be described in more details later, the cleaner 45 is rotated forward basically between a document and the next document. Alternatively, the cleaning operation may be performed immediately before the start of a reading job or immediately after the completion of a reading job. Further, when the number of read images has reached a predetermined number, which depends on the image reading mode, the cleaning operation is performed.

If the cleaner 45 is always rotated forward and slides on the reading glass 40 in one direction for a long time, the tip portion of the brush 45b will curve along the rotating direction, and the effect of the cleaning operation may be lower. In order to correct the deformation (curve) of the tip portion of the brush 45b, the cleaner 45 may be rotated backward at any appropriate times. When the cleaner 45 is rotated backward, the brush 45b passes through the duster 46 and slides on the reading glass 40 in the opposite direction, whereby the deformation of the brush 45b is corrected. Thus, by rotating the cleaner 45 backward at times, it is possible to keep a good cleaning effect for a long time.

Next, referring to FIG. 5, a mechanism for driving the cleaner 45 is described. A sprocket 31 fixed to an end of the shaft 45a is connected to an output sprocket 32 of a cleaner motor M1 via a timing belt 33. The cleaner motor M1 is a reversible stepping motor.

A round tab 35 is fitted to the sprocket 31, and a home position sensor SE2 is provided to detect the tab 35. When the sensor SE2 detects an end 35a of the tab 35, it means that the cleaner brush 45b is in the home position.

Control Unit; See FIG. 6

Figure 6:
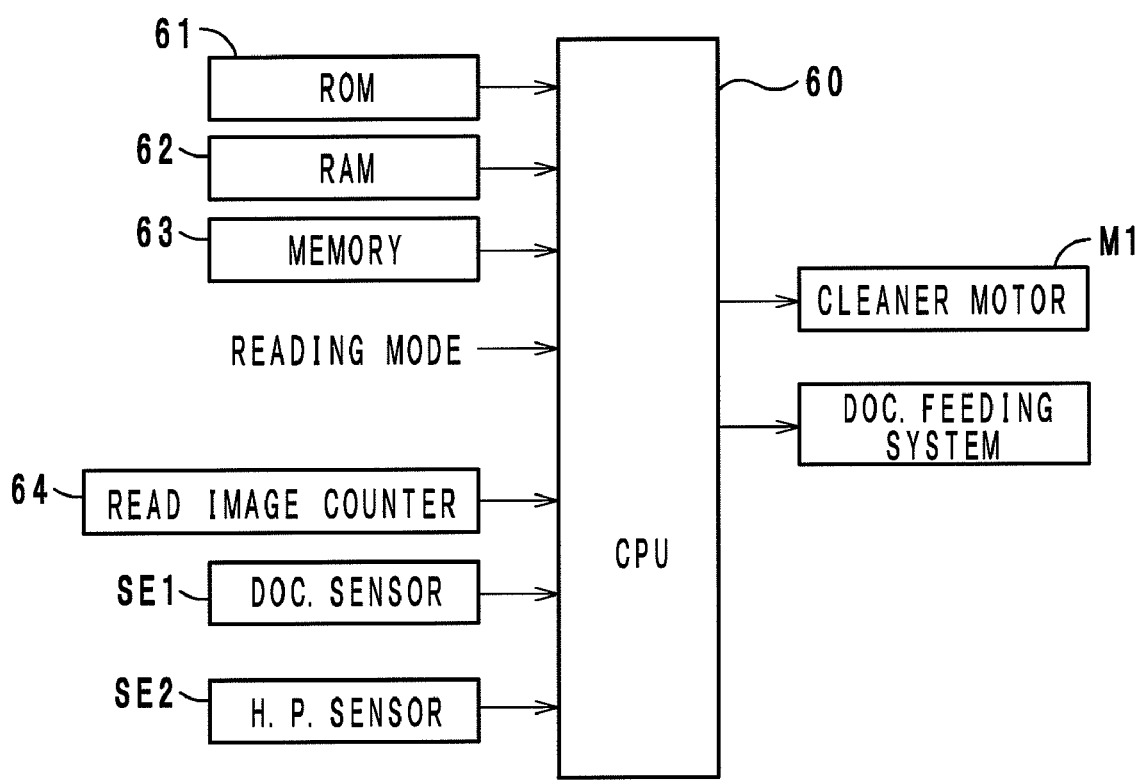
FIG. 6 is a block diagram showing a control unit of the image reading apparatus.

Referring to FIG. 6, a control unit of the image reading apparatus 10 is described. The main component of the control unit is a CPU 60, and the CPU 60 incorporates a ROM 61 stored with programs, a RAM 62 and a memory 63. Information inputted to the CPU 60 are a selected image reading mode (which will be described later), a number indicated by a counter 64 that shows the number of read images, a leading edge detection signal and a trailing edge detection signal outputted from a document sensor SE1 (see FIG. 2) located at an upstream position from the reading position "A", a detection signal outputted from the cleaner home position sensor SE2 and so on. The CPU 60 controls the document feeding system comprising various rollers, the cleaner motor M1 and the like.

Relationship Between Reading Efficiency and Cleaning Effect

Table 1(A) below shows the relationship between the reading efficiency and the cleaning effect. Table 1(B) shows the relationship between the number of rotations/the rotation speed of the cleaner 45 and the cleaning effect. Table 1(C) shows the degree of demand for high-quality pictures. Table 1(D) shows the frequency of occurrences of stripe noise.

TABLE 1

| (A) Relationship between Productivity and Cleaning Effect | | |
| --- | --- | --- |
| Productivity (Reading Speed) | Good (High) | No Good (Low) |
| Rotation Speed of Cleaner | High | Low |
| Number of Rotations of Cleaner | Small | Large |
| Feeding Intervals among Documents | Short | Long |
| Cleaning Effect | No Good | Good |

| (B) Cleaning Effect | | |
| --- | --- | --- |
| Cleaning Effect | Good | No Good |
| Number of Rotations of Cleaner | Large | Small |
| Rotation Speed of Cleaner | Low | High |

| (C) Demand for High Picture Quality | | |
| --- | --- | --- |
| Demand for High Picture Quality | High | Low |
| Reading Mode | Color | Monochromatic |

| (D) Frequency of Occurrences of Stripe Noise | | |
| --- | --- | --- |
| | Frequency of Occurrences of Stripe Noise | |
| | High | Low |
| Reading Mode | Color, High-Resolution, Copy | Monochromatic, Low-Resolution, Facsimile/Scan |

The cleaning operation is performed between the trailing edge of a document and the leading edge of the next document. The cleaning effect becomes lower when the rotation speed of the cleaner 45 is high and when the number of rotations of the cleaner 45 is smaller. Meanwhile, the productivity becomes lower when the rotation speed of the cleaner 45 is low and when the number of rotations of the cleaner 45 is large. That is, as shown by FIG. 1(A), under the conditions that the rotation speed of the cleaner 45 is high, that the number of rotations of the cleaner 45 is small and that the intervals among documents are short, the productivity is good, while the cleaning effect is bad. On the other hand, under the conditions that the rotation speed of the cleaner 45 is low, that the number of rotations of the cleaner 45 is large and that the intervals among documents are long, the cleaning effect is good, while the productivity is bad.

As Table 1(B) shows, under the conditions that the number of rotations of the cleaner 45 is large and that the rotation speed of the cleaner 45 is low, the cleaning effect is good. On the other hand, under the conditions that the number of rotations of the cleaner 45 is small and that the rotating speed of the cleaner 45 is high, the cleaning effect is bad. As table 1(C) shows, the demand for high picture quality is high in a color mode but low in a monochromatic mode. As Table 1(D), stripe noise frequently occurs in a color mode, a high-resolution mode and/or a copy mode but does not occur so frequently in a monochromatic mode, a low-resolution mode and/or a facsimile/scan mode.

Specific Values

Next, Tables 2(A)-(C) show the frequency of cleaning operations, the rotation speed of the cleaner 45 and the number of rotations of the cleaner 45. In the cases shown by Tables 2(A)-(C), image reading is performed by a 600-dpi color CCD, and the document feeding speed (image reading speed) is 197 mm/s.

TABLE 2

600-dpi Color CCD
Document Feeding (Image Reading) Speed: 197 mm/s

|  |  | Monochromatic | Color |
|---|---|---|---|
| (A) Frequency of Cleaning Operations | | | |
| Low-Resolution | Facsimile | Every Third Interval | Every Interval |
|  | 200-dpi Scan | Every Third Interval | Every Interval |
|  | 300-dpi Scan | Every Third Interval | Every Interval |
| High-Resolution | 600-dpi Scan | Every Second Interval | Every Interval |
| (B) Rotation Speed of Cleaner | | | |
| Low-Resolution | Facsimile | 315 mm/s | 210 mm/s |
|  | 200-dpi Scan | 315 mm/s | 210 mm/s |
|  | 300-dpi Scan | 315 mm/s | 210 mm/s |
| High-Resolution | 600-dpi Scan | 250 mm/s | 210 mm/s |
| (C) Number of Rotations of Cleaner per Cleaning Operation | | | |
| Low-Resolution | Facsimile | 1 | 3 |
|  | 200-dpi Scan | 1 | 3 |
|  | 300-dpi Scan | 1 | 3 |
| High-Resolution | 600-dpi Scan | 2 | 3 |

As shown by Table 2(A), in color modes, the cleaning operation by the cleaner 45 is performed every interval among documents (every image reading operation). In a monochromatic facsimile mode, in a monochromatic 200-dpi scan mode and in a monochromatic 300-dpi scan mode, the cleaning operation is performed every third interval among documents (every three image reading operations). In a monochromatic 600-dpi scan mode, the cleaning operation is performed every other interval among documents (every other image reading operation). As shown by Table 2(B), in the color modes, the rotation speed of the cleaner 45 is 210 mm/s. In the monochromatic facsimile mode, in the monochromatic 200-dpi scan mode and in the monochromatic 300-dpi scan mode, the rotation speed of the cleaner 45 is 315 mm/s. In the monochromatic 600-dpi scan mode, the rotation speed of the cleaner 45 is 250 mm/s. As shown by Table 2(C), in the color modes, the number of rotations of the cleaner 45 per cleaning operation is three. In the monochromatic facsimile mode, in the monochromatic 200-dpi scan mode and in the monochromatic 300 dpi-scan mode, the number of rotations of the cleaner 45 per cleaning operation is one. In the monochromatic 600-dpi scan mode, the number of rotations of the cleaner 45 per cleaning operation is two.

Brief Description of Exemplary Control Procedures

An exemplary control over the cleaning operations in accordance with Tables 2(A)-(C) is described below. First, the frequency of cleaning operations is set in accordance with the selected reading mode. Specifically, when a reading mode selection is made between a color mode and a monochromatic mode, the frequency of cleaning operations is switched so that the cleaning operation will be performed more frequently in the color mode than in the monochromatic mode. When a reading mode selection is made between a high-resolution mode and a low-resolution mode, the frequency of cleaning operations is switched so that the cleaning operation will be performed more frequently in the high-resolution mode than in the low-resolution mode. When a reading mode selection is made between a copy mode and a facsimile/scan mode, the frequency of cleaning operations is switched so that the cleaning operation will be performed more frequently in the copy mode than in the facsimile/scan mode. Such setting control will be described as control procedure 1.

Also, the rotation speed and/or the number of rotations of the cleaner 45 are set in accordance with the selected reading mode. Specifically, when a reading mode selection is made between a color mode and a monochromatic mode, the rotation speed of the cleaner 45 is switched so that the speed will be higher in the monochromatic mode than in the color mode. When a reading mode selection is made between a high-resolution mode and a low-resolution mode, the rotation speed of the cleaner 45 is switched so that the speed will be higher in the low-resolution mode than in the high-resolution mode. When a reading mode selection is made between a copy mode and a facsimile/scan mode, the rotation speed of the cleaner 45 is switched so that the speed will be higher in the facsimile/scan mode than in the copy mode. Such setting control will be described as control procedure 2.

Further, when a reading mode selection is made between a color mode and a monochromatic mode, the number of rotations of the cleaner 45 is switched so that the number of rotations will be larger in the color mode than in the monochromatic mode. When a reading mode selection is made between a high-resolution mode and a low-resolution mode, the number of rotations of the cleaner 45 is switched so that the number of rotations will be larger in the high-resolution mode than in the low-resolution mode. When a reading mode selection is made between a copy mode and a facsimile/scan mode, the number of rotations of the cleaner 45 is switched so that the number of rotations will be larger in the copy mode than in the facsimile/scan mode. Such setting control will be described as control procedure 3.

Additionally, the intervals among documents wherein the cleaning operation is not performed are set shorter than the intervals wherein the cleaning operation is performed. For example, as shown in Table 2(A), in monochromatic modes, the cleaning operation is performed at every third interval among documents. Specifically, the cleaning operation is not performed in the intervals between the first document and the second document and between the second document and the third document, and the cleaning operation is performed in the interval between the third document and the fourth document. Therefore, the intervals between the first document and the second document and between the second document and the third document are set shorter than the interval between the third document and the fourth document. With this arrangement, the reduction in the image reading efficiency can be minimized.

Control Procedure 1; See FIGS. 7-10

An exemplary control procedure for changing the frequency of performing cleaning operations by the cleaner 45 in accordance with the image reading mode (control procedure 1) is described. In this description of the control procedure 1 and the following descriptions of control procedures 2 and 3, the operation of a copying machine (although not shown) is also described. In the descriptions, a "job" means a series of copying operations or image reading operations toward a number of documents placed on the tray 21.

Figure 7:
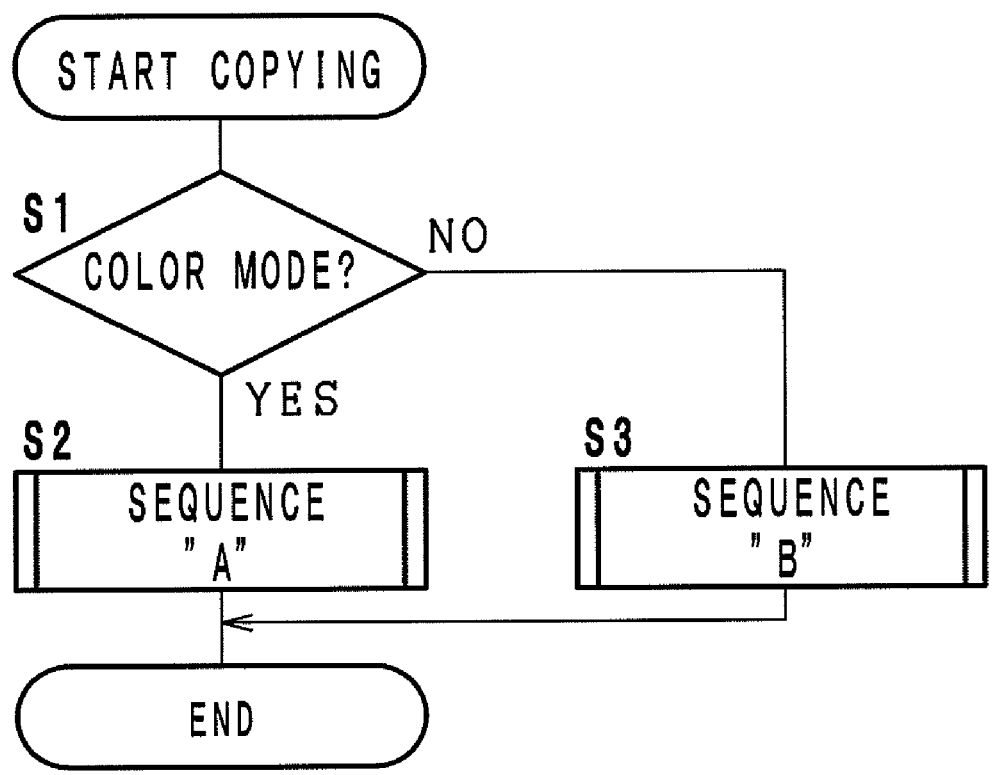
FIG. 7 is a flowchart showing a control procedure 1.

As FIG. 7 shows, at a start of copying, when the image reading mode is judged to be a color mode ("YES" at step S1), a sequence "A" is performed (step S2). When the image reading mode is not a color mode ("NO" at step 1), a sequence "B" is performed (step S3).

Figure 8:
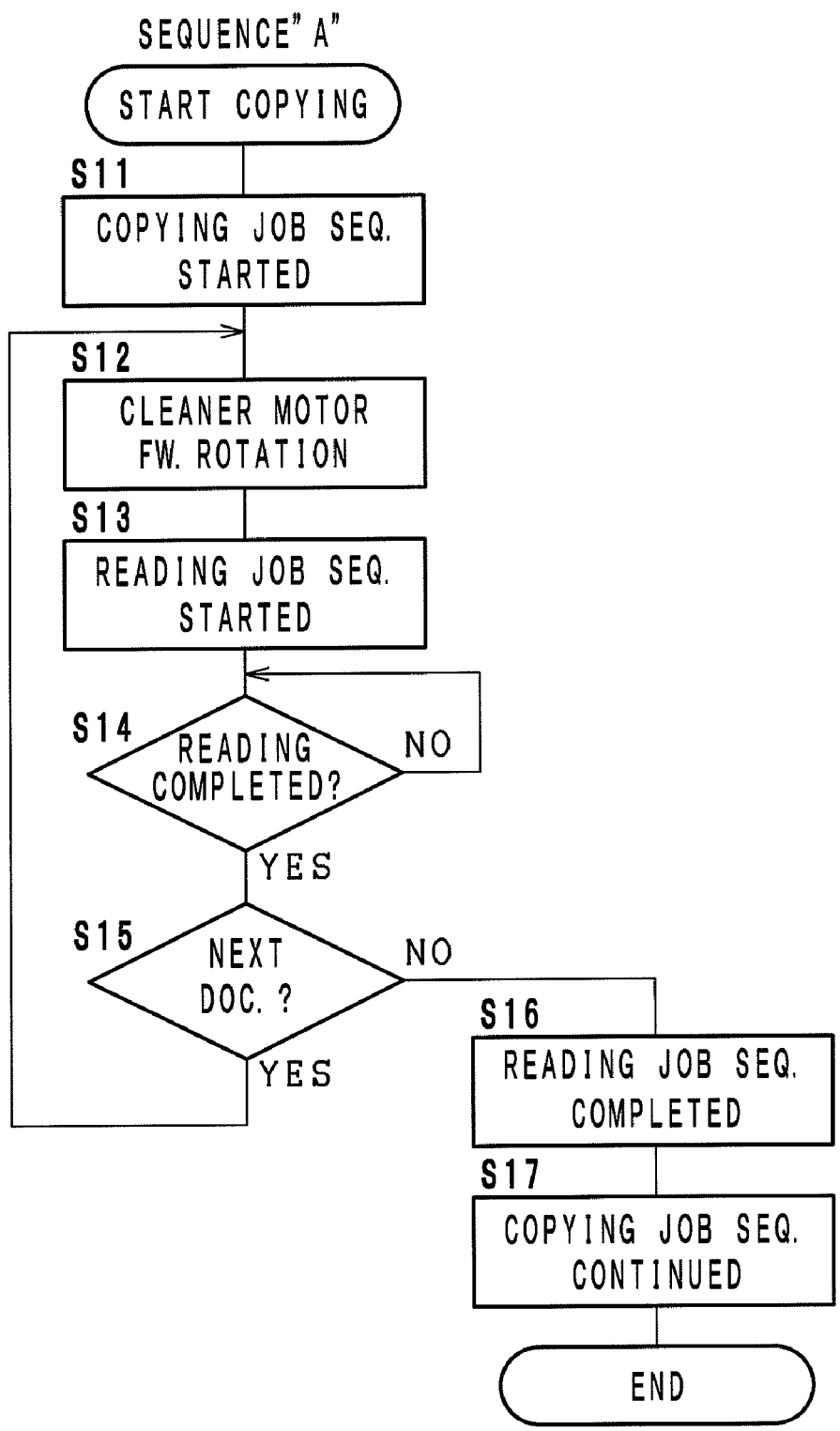
FIG. 8 is a flowchart showing a sequence A in the control procedure 1.

The sequence "A" performed at step S2 is shown by FIG. 8. When the copying machine starts copying, a copying job sequence is started (step S11), and the cleaner motor M1 makes one forward rotation (step S12). Next, a reading job sequence is started (step S13). When image reading of a document is completed ("YES" at step S14), it is judged whether there is a document to be subjected to image reading next (step S15). When there is a document to be subjected to image reading next ("YES" at step S15), the processing goes back to step S12, and when there are no more documents to be subjected to image reading ("NO" at step S15), the reading job sequence is completed at step S16, and the copying job sequence is continued at step S17.

Figure 9:
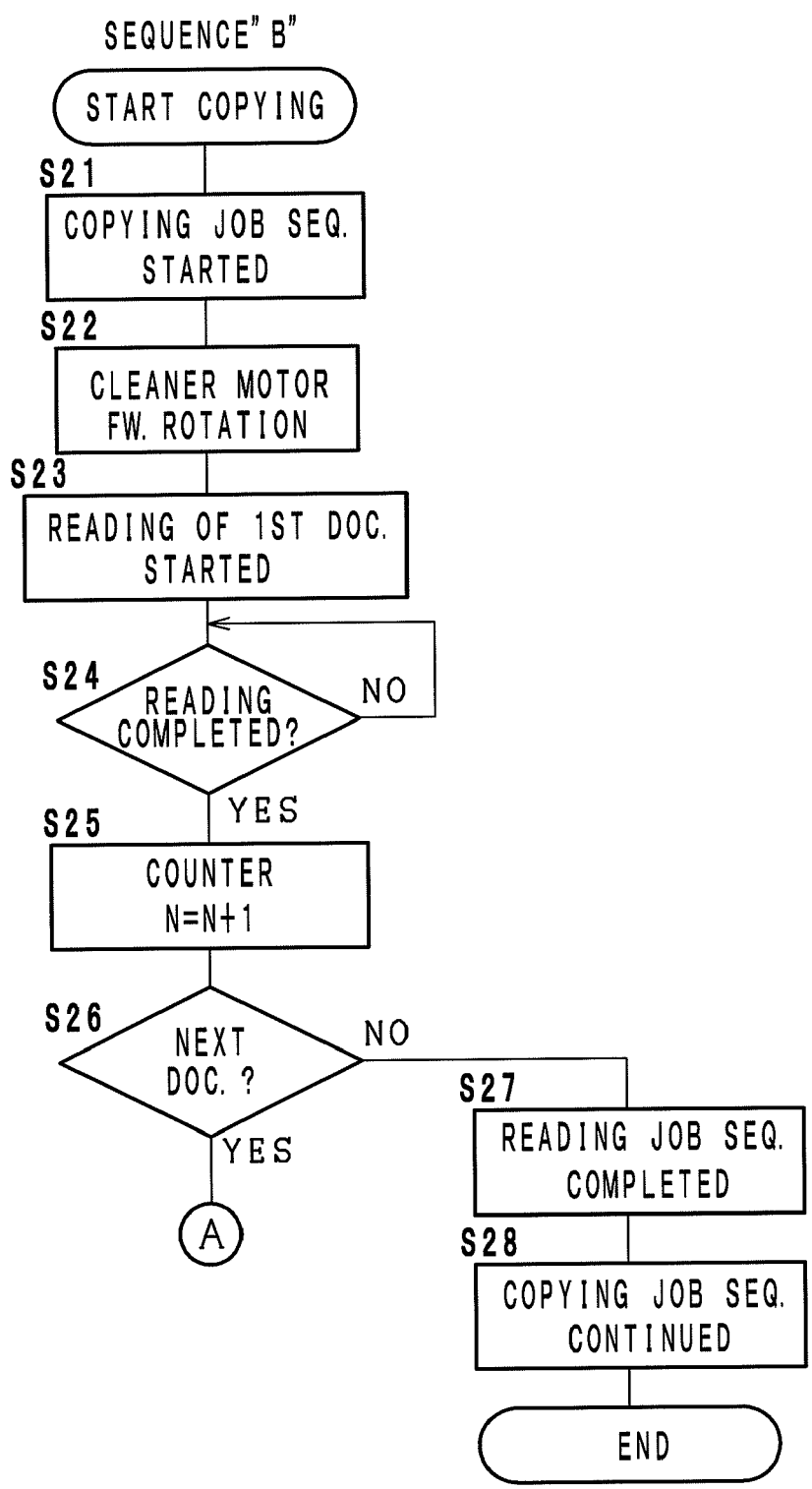
FIGS. 9 and 10 are flowcharts showing a sequence B in the control procedure 2.
Figure 10:
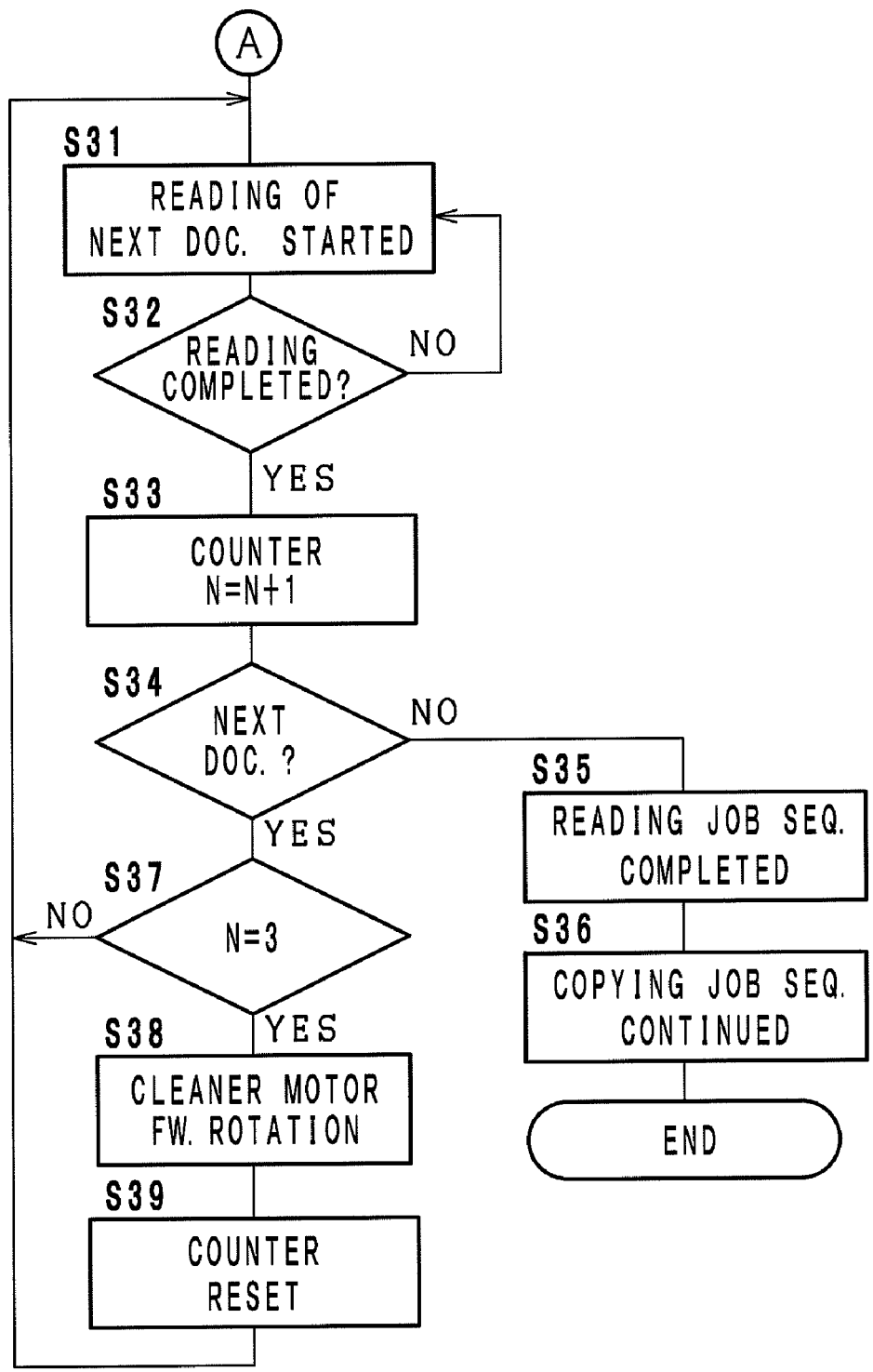

The sequence "B" performed at step 3 is shown by FIGS. 8 and 9. When the copying machine starts copying, a copying job sequence is started at step S21, and the cleaner motor M1 makes one forward rotation (step S22). Then, a reading job sequence is started. Image reading toward a first document is started (step S33), and when the image reading toward the first document is completed ("YES" at step S24), one is added to the counter value N of the read image counter 64 (step S25). Then, when there are no more documents to be subjected to image reading ("NO" at step S26), the reading job sequence is completed (step S27), and the copying job sequence is continued (step S28).

On the other hand, when there is a document to be subjected to image reading next ("YES" at step S26), image reading toward the next document is started (step S31), and when the image reading toward the next document is completed ("YES" at step S32), one is added to the counter value N of the read image counter 64 (step S33). Thereafter, there are no more documents to be subjected to image reading ("NO" at step S34), the reading job sequence is completed (step S35), and the copying job sequence is continued (step S36).

When there is a document to be subjected image reading next ("YES" at step S34), the counter value N of the read image counter 64 is judged whether to be "3" or not. When the counter value N is less than "3" ("NO" at step S37), the processing goes back to step S31. When the counter value N is "3" ("YES" at step S37), the cleaner motor M1 makes one forward rotation (step S38), and the read image counter 64 is reset (step S39). Then, the processing goes back to step S31.

The reference number for the judgment at step S37 depends on the mode as shown by Table 2(A). The reference number is "3" in the facsimile/scan mode, while the reference number is "2" in the high-resolution (600 dpi) mode.

Control Procedure 2; See FIG. 11

Figure 11:
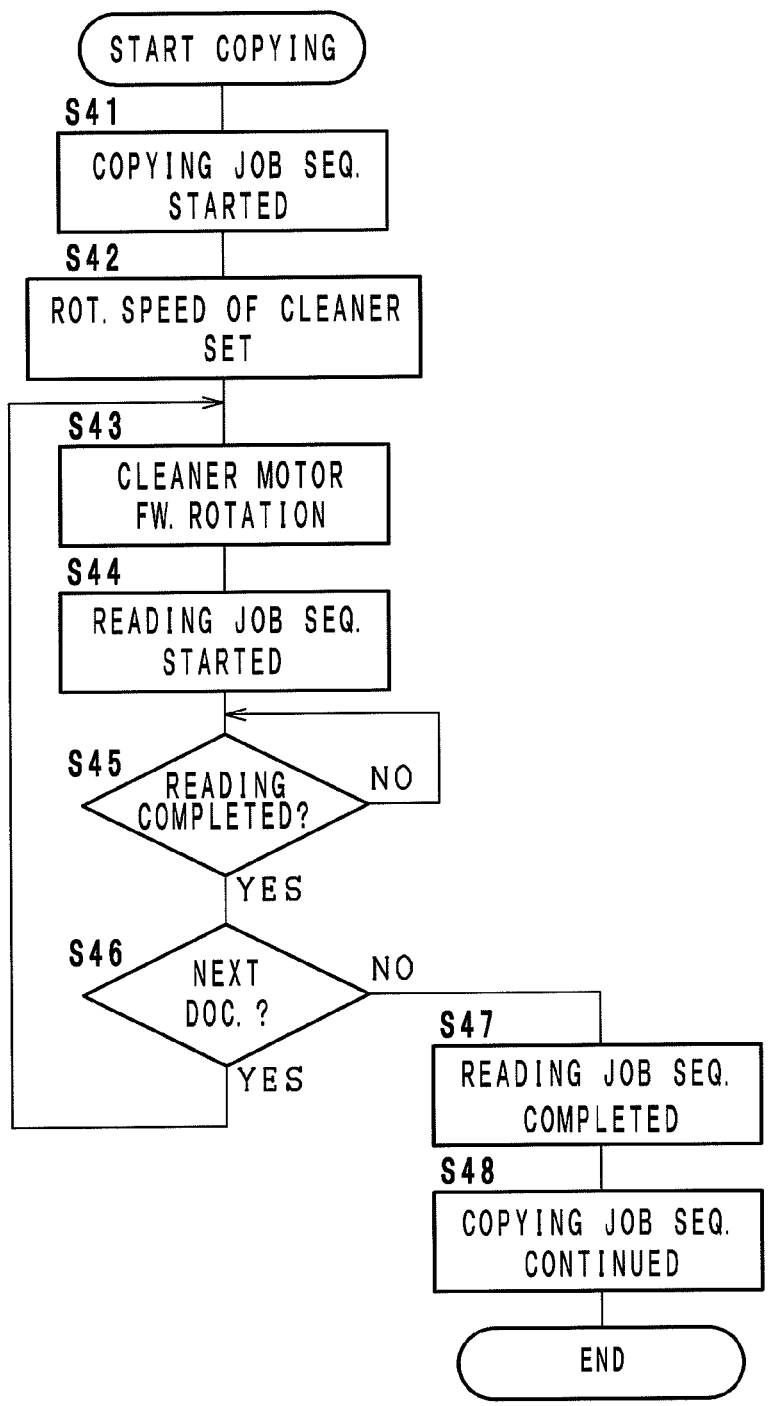
FIG. 11 is a flowchart showing a control procedure 2.

Next, an exemplary control procedure for changing the rotation speed of the cleaner 45 in accordance with the image reading mode (control procedure 2) is described. As FIG. 11 shows, when the copying machine starts copying, a copying job sequence is started (step S41), and the rotation speed of the cleaner 45 is set (at step S42). Here, the rotation speed is set to one of the predetermined speeds for the respective image reading modes as shown by Table 2(B).

Thereafter, the cleaner motor M1 makes one forward rotation at the set speed (step S43). Next, a reading job sequence is started (step S44). When image reading toward a document is completed ("YES" at step S45), it is judged whether there is a document to be subjected image reading next (step S46). When there is a document to be subjected to image reading next ("YES" at step S46), the processing goes back to step S43. When there are no more documents to be subjected to image reading ("NO" at step S46), the reading job sequence is completed (step S47), and the copying job sequence is continued (step S48).

Control Procedure 3; See FIG. 12

Figure 12:
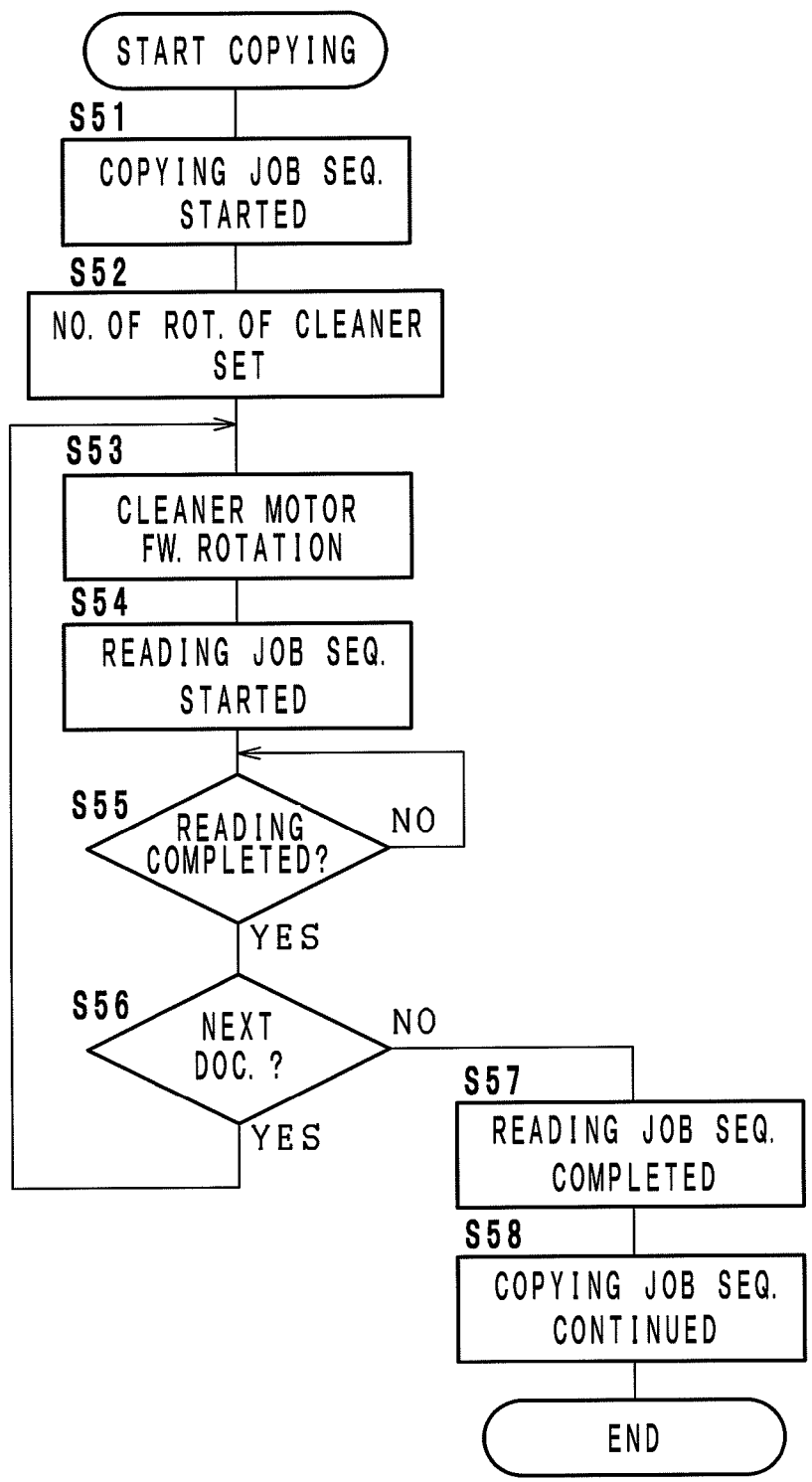
FIG. 12 is a flowchart showing a control procedure 3.

Next, an exemplary control procedure for changing the number of rotations of the cleaner 45 in accordance with the image reading mode (control procedure 3) is described. As FIG. 12 shows, when the copying machine starts copying, a copying job sequence is started (step S51), and the number of rotations of the cleaner 45 is set (step S52). Here, the number of rotations is set to one of the predetermined number for the respective image reading modes as shown by Table 2(C).

Thereafter, the cleaner 45 makes forward rotations by the set number (step S53). Next, a reading job sequence is started (step S54). When image reading toward a document is completed ("YES" at step S55), it is judged whether there is a document to be subjected to image reading next (step S56). When there is a document to be subjected to image reading next ("YES" at step S56), the processing goes back to step S53. When there are no more documents to be subjected to image reading ("NO" at step S56), the reading job sequence is completed at step S57, and the copying job sequence is continued at step S58.

Other Embodiments

In the embodiment above, documents are fed in a non-contact manner such that the documents are not in contact with the reading glass. However, it is not always necessary to feed documents in the non-contact manner. The structure and the operation of the duster with regard to the cleaner may be arbitrarily designed, or alternatively, the duster may be omitted.

Although the present invention has been described in connection with the preferred embodiment above, it is to be noted that various changes and modifications are possible to those who are skilled in the art. Such changes and modifications are to be understood as being within the scope of the present invention.

What is claimed is:

1. An image reading apparatus comprising:
a document feeder for feeding documents one by one such that each document can pass through an image reading position;
an image reader for optically reading an image of a document passing through the image reading position;
a transparent member located between the document passing through the image reading position and the image reader;
a cleaner for performing a cleaning operation by sweeping a surface of the transparent member on which the document passes, the cleaner having elasticity; and
a controller for controlling drives of the cleaner and other elements,
wherein the controller enables the image reading apparatus to operate in various reading modes, enables the cleaner to operate in various cleaning modes and changes a frequency of cleaning operations performed by the cleaner in accordance with a selected image reading mode.

2. An image reading apparatus according to claim 1, wherein when a reading mode selection is made between a color mode and a monochromatic mode, the controller switches the frequency of cleaning operations performed by the cleaner such that the cleaner performs cleaning operations more frequently in the color mode than in the monochromatic mode.

3. An image reading apparatus according to claim 1, wherein when a reading mode selection is made between a high-resolution mode and a low-resolution mode, the controller switches the frequency of cleaning operations performed by the cleaner such that the cleaner performs cleaning operations more frequently in the high-resolution mode than in the low-resolution mode.

4. An image reading apparatus according to claim 1, wherein when a reading mode selection is made between a copy mode and a facsimile/scan mode, the controller switches the frequency of cleaning operations performed by the cleaner such that the cleaner performs cleaning operations more frequently in the copy mode than in the facsimile/scan mode.

5. An image reading apparatus according to claim 1, wherein the controller sets feeding intervals among documents such that a feeding interval in which the cleaner does not perform the cleaning operation is shorter than a feeding interval in which the cleaner performs the cleaning operation.

6. An image reading apparatus comprising:
a document feeder for feeding documents one by one such that each document can pass through an image reading position;
an image reader for optically reading an image of a document passing through the image reading position;
a transparent member located between the document passing through the image reading position and the image reader;
a cleaner for performing a cleaning operation by sweeping a surface of the transparent member on which the document passes, the cleaner having elasticity; and
a controller for controlling drives of the cleaner and other elements,
wherein the controller enables the image reading apparatus to operate in various reading modes, enables the cleaner to operate in various cleaning modes and changes a rotation speed of the cleaner and/or a number of rotations of the cleaner in accordance with a selected image reading mode.

7. An image reading apparatus according to claim 6, wherein a reading mode selection is made between a monochromatic mode and a color mode, the controller switches the rotation speed of the cleaner such that the rotation speed is higher in the monochromatic mode than in the color mode.

8. An image reading apparatus according to claim 6, wherein a reading mode selection is made between a low-resolution mode and a high-resolution mode, the controller switches the rotation speed of the cleaner such that the rotation speed is higher in the low-resolution mode than in the high-resolution mode.

9. An image reading apparatus according to claim 6, wherein a reading mode selection is made between a facsimile/scan mode and a copy mode, the controller switches the rotation speed of the cleaner such that the rotation speed is higher in the facsimile/scan mode than in the copy mode.

10. An image reading apparatus according to claim 6, wherein when a reading mode selection is made between a color mode and a monochromatic mode, the controller switches the number of rotations of the cleaner such that the number of rotations is larger in the color mode than in the monochromatic mode.

11. An image reading apparatus according to claim 6, wherein when a reading mode selection is made between a high-resolution mode and a low-resolution mode, the controller switches the number of rotations of the cleaner such that the number of rotations is larger in the high-resolution mode than in the low-resolution mode.

12. An image reading apparatus according to claim 6, wherein when a reading mode selection is made between a copy mode and a facsimile/scan mode, the controller switches the number of rotations of the cleaner such that the number of rotations is larger in the copy mode than in the facsimile/scan mode.

13. An image reading apparatus comprising:
a document feeder for feeding documents one by one such that each document can pass through an image reading position;
an image reader for optically reading an image of a document passing through the image reading position;
a transparent member located between the document passing through the image reading position and the image reader;
a cleaner for performing a cleaning operation by sweeping a surface of the transparent member on which the document passes, the cleaner having elasticity; and
a controller for controlling drives of the cleaner and other elements,
wherein the controller enables the image reading apparatus to operate in various reading modes, enables the cleaner to operate in various cleaning modes and sets feeding intervals among documents such that a feeding interval in which the cleaner does not perform the cleaning operation is shorter than a feeding interval in which the cleaner performs the cleaning operation.

14. An image reading apparatus according to claim 1;
wherein the cleaner is a brush; and
wherein a portion of the brush that comes into contact with the transparent member has a lower rigidity than the transparent member, such that the portion of the brush is elastically deformed by the contact with the transparent member.

15. An image reading apparatus according to claim 6;
wherein the cleaner is a brush; and wherein a portion of the brush that comes into contact with the transparent member has a lower rigidity than the transparent member, such that the portion of the brush is elastically deformed by the contact with the transparent member.

16. An image reading apparatus according to claim 13; wherein the cleaner is a brush; and
wherein a portion of the brush that comes into contact with the transparent member has a lower rigidity than the transparent member, such that the portion of the brush is elastically deformed by the contact with the transparent member.

* * * * *